Dec. 30, 1941.  M. KLAVÍK  2,267,828
ARRANGEMENT FOR COOLING MOTORS BY AIR
Filed Sept. 1, 1939
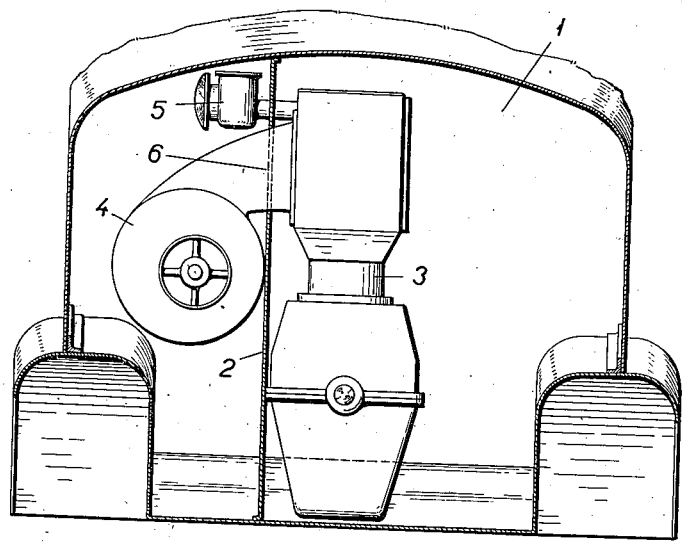

ARRANGEMENT FOR COOLING MOTORS BY AIR

Miloš Klavík, Prague-Smichov, Czechoslovakia

Application September 1, 1939, Serial No. 293,140
In Czechoslovakia September 1, 1938

2 Claims. (Cl. 180—54)

In automobiles with air-cooled straight type motors, it is necessary to take precautions to prevent the heated air from mixing with the fresh air drawn in by the blower. The usual arrangement of sheet metal casings surrounding the motor and conducting the air to louvres in the cover of the motor chamber has the disadvantage that quite a number of important parts of the motor are inaccessible.

According to the invention, this disadvantage is obviated by dividing the entire motor chamber into two parts by a vertical longitudinal wall, of which parts one contains only fresh air and the other only heated air, this separating wall extending closely along the motor, the air distribution duct from the blower to the motor cylinders, and also if desired the induction pipe from the carburettor of the motor, passing through the said wall.

The accompanying drawing shows diagrammatically a constructional example of the invention in cross-section through the motor chamber.

The motor chamber 1 is divided by a vertical wall 2 extending in the longitudinal direction in such a manner that said wall passes close along the motor 3. The blower 4 is accommodated in the smaller part of the chamber 1 where the cooling air is supplied. To enable this wall also to prevent the radiation of heat from the motor and thereby unnecessary preheating of the cooling air, it may advantageously be made of suitable insulating material. Passing through the wall 2 from the blower 4 to the motor is the cooling air distribution pipe 6 and the motor induction pipe coming from the carburettor 5 but by connecting the carburettor to the warm part of the chamber 1, for example in winter, warm air may also be drawn in.

I claim:

1. An air cooling system for internal combustion motors, particularly for motor vehicles, comprising a chamber in which the motor is mounted, said chamber being formed in a hood in front of a vehicle body, a vertical partition wall of heat insulating material extending longitudinally along one side of said motor and dividing said chamber into two compartments, one of which is continuously supplied with fresh air, while the other compartment contains said motor, a blower for air within the compartment which is supplied with fresh air, said blower being provided with a discharge conduit passing through said vertical partition wall and directing cooling air against the motor in the motor compartment.

2. An air cooling system for internal combustion motors, particularly for motor vehicles, comprising a chamber in which the motor is mounted, said chamber being formed in a hood in front of a vehicle body, a vertical partition wall of heat insulating material extending longitudinally along one side of said motor and dividing said chamber into two compartments, one of which is continuously supplied with fresh air, while the other compartment contains said motor, a blower for air and a carburetor within the compartment which is supplied with fresh air, said blower being provided with a discharge conduit passing through said vertical partition wall and directing cooling air against the motor in the motor compartment, said carburetor having an air inlet connected with the compartment containing the blower and with an outlet conduit passing through said vertical wall and connected with said motor.

MILOŠ KLAVÍK.